United States Patent
Krahl et al.

(10) Patent No.: US 8,322,116 B2
(45) Date of Patent: Dec. 4, 2012

(54) DEVICE FOR THE ROLL-SEALING OF SHEETS

(75) Inventors: Wolfgang Krahl, Laupheim (DE); Joerg Knueppel, Schwendi (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 496 days.

(21) Appl. No.: 12/604,086

(22) Filed: Oct. 22, 2009

(65) Prior Publication Data

US 2010/0107558 A1    May 6, 2010

(30) Foreign Application Priority Data

Nov. 5, 2008  (EP) .................................. 08168356

(51) Int. Cl.
*B65B 47/04*  (2006.01)
(52) U.S. Cl. .................. 53/158; 53/546; 53/548
(58) Field of Classification Search .............. 53/158, 53/534, 545, 548, 553, 416, 443, 546
See application file for complete search history.

(56) References Cited

U.S. PATENT DOCUMENTS

| | | | | |
|---|---|---|---|---|
| 2,139,041 A | * | 12/1938 | Salfisberg | 53/157 |
| 3,397,505 A | * | 8/1968 | Critchell | 53/74 |
| 3,904,465 A | * | 9/1975 | Haase et al. | 156/199 |
| 4,395,254 A | * | 7/1983 | Schuster | 493/196 |
| 5,316,603 A | | 5/1994 | Akazawa et al. | |
| 5,802,804 A | * | 9/1998 | Esposti et al. | 53/55 |
| 6,783,823 B2 | * | 8/2004 | Lasson et al. | 428/34.2 |
| 6,800,162 B2 | * | 10/2004 | Kannankeril et al. | 156/145 |
| 7,797,909 B2 | * | 9/2010 | Ream et al. | 53/54 |
| 8,091,319 B2 | * | 1/2012 | Ream et al. | 53/111 R |

FOREIGN PATENT DOCUMENTS

| | | |
|---|---|---|
| DE | 10052218 A1 | 5/2002 |
| DE | 10341450 A1 | 3/2005 |
| DE | 102004062520 A1 | 7/2006 |
| DE | 102006020453 B3 | 3/2007 |
| EP | 0435638 A1 | 7/1991 |

* cited by examiner

*Primary Examiner* — Christopher Harmon

(74) *Attorney, Agent, or Firm* — Brinks Hofer Gilson & Lione

(57) ABSTRACT

The device for the roll-sealing of sheets has a mating roll and a sealing roll, which presses against the mating roll with a sealing force, so that a molded sheet and a cover sheet can be guided between the sealing roll and the mating roll and sealed to form a sealed composite sheet structure. The surface of the mating roll has recesses to accept blister pockets of the molded sheet and a rippled structure. The elevations formed by the rippled structure comprise contact areas of different sizes.

6 Claims, 5 Drawing Sheets

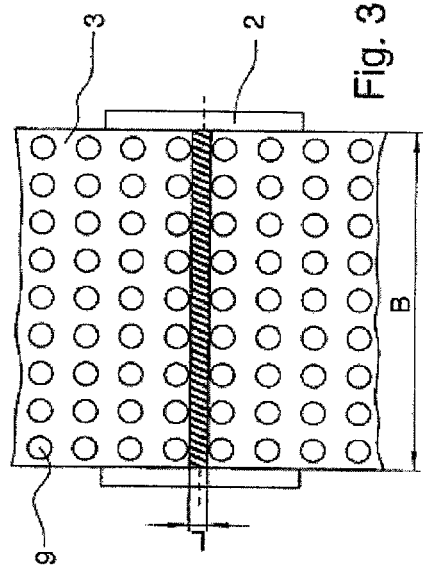
Fig. 3
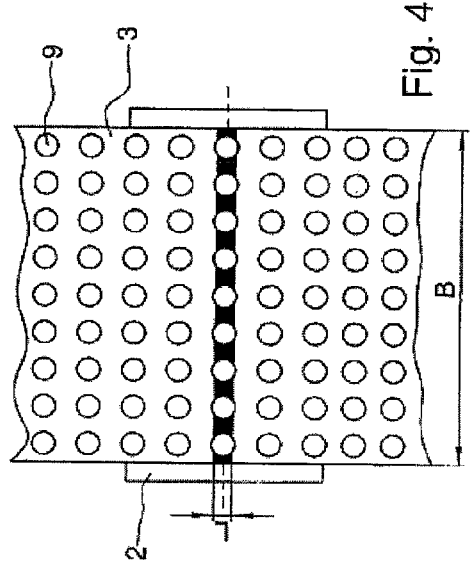
Fig. 4
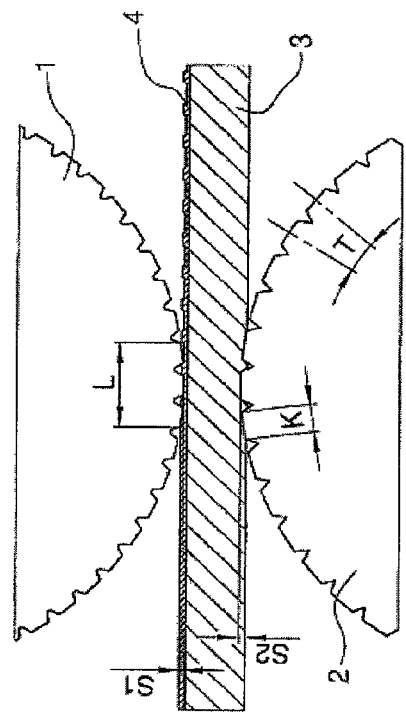
Fig. 5
Fig. 6

DEVICE FOR THE ROLL-SEALING OF SHEETS

CROSS-REFERENCE TO RELATED APPLICATIONS

The present patent document claims the benefit of priority to European Patent Application No. EP 08168356.7, filed Nov. 5, 2008, and entitled "DEVICE FOR THE ROLL-SEALING OF SHEETS," the entire contents of each of which are incorporated herein by reference.

FIELD OF THE INVENTION

The present invention pertains to a device for the roll-sealing of sheets, which is used especially in the production of medication packages such as blister packs.

BACKGROUND OF THE INVENTION

A known device for the roll-sealing of sheets is described in, for example, DE 100 52 218 A1. These devices consist essentially of a sealing roll and a mating roll, through which a shaped, molded sheet is transported along with a cover sheet. A heater raises the temperature of the sealing roll, which is pressed against the mating roll with a certain sealing force. As a result, the cover sheet is pressed against the molded sheet and bonded to it. The medication package is thus sealed. The combination of the parameters in question, namely, temperature, applied pressure of the sealing roll, and transport speed of the mating roll, generally determines the quality of the seal.

The molded sheet and the cover sheet are bonded together in the area where the sealing roll presses against the mating roll. The molded sheet comprises blister pockets, however, which must fit into corresponding recesses in the mating roll, so that a flat sealing surface is obtained. The contact area between the molded sheet and the sealing sheet is therefore not always of the same size; that is, the contact line is interrupted in the area where the recesses or blister pockets are located.

In cases where the sealing roll is pressed with a constant sealing force, the continuously changing contact area causes the pressure which is applied between the molded sheet and the cover sheet to vary. The result of this is that the sealing roll sinks into the composite sheet structure to various depths. This means in turn that the sheets are sealed in a nonuniform manner, and this lack of uniformity is visible on the medication package.

In the prior art, as in, for example, DE 10 2004 062 520 A1, various approaches have been taken to equalize the applied pressure by automatically controlling the sealing force of the sealing roll as a function of the positions of the recesses and blister pockets and thus to produce a more uniform sealing effect. This automatic sealing control, however, is highly complicated and is very difficult to manage at high machine speeds.

DE 10 2006 020 453 B3 describes a method for the production of sealing tools under consideration of a characteristic value for sealing quality, wherein the tolerances of the sealing tools and sheets are compensated by defining the penetration depth of opposing sets of ripples on the sealing roll and mating roll. This document provides a formula for the required ripple surface area A, wherein the rippled structure is distributed uniformly and symmetrically over the sealing roll and the mating roll. The use of rippled sealing rolls of this type also leads to nonuniform sealing effects, however, especially when a constant sealing force is used, because the applied pressure still varies as already described above.

BRIEF SUMMARY OF THE INVENTION

It is an object of the present invention to provide an improved device for the roll-sealing of sheets which comprises a simple design and ensures a uniform sealing effect.

The device for the roll-sealing of sheets according to the invention comprises a mating roll and a heated sealing roll, which presses against the mating roll with a certain sealing force so that a molded sheet and a cover sheet can be conducted between the sealing roll and the mating roll and sealed together to form a sealed composite sheet structure, wherein the surface of the mating roll comprises recesses to accept the blister pockets of the molded sheet and a rippled structure. The elevations formed by the rippled structure comprise contact areas of different sizes.

The sealing force of the sealing roll is preferably constant. It is thus possible to do without complicated automatic sealing force control devices. As a result, the pressure applied between the molded sheet and the cover sheet is uniform over the entire contact area, and thus a uniform and high-quality sealing effect is obtained.

It is especially advantageous for the rippled structure to be a linear rippled structure. "Linear rippled structure" is understood to mean that the elevations on the mating roll are produced by linear notches extending over the entire width of the mating roll. These notches can be produced by milling and can have, for example, either the shape of a V or that of a U. The contact areas of the elevations comprise an essentially flat surface. Linear rippled structure offers the advantage that it is easy to produce.

Alternatively, the rippled structure of the mating roll can be designed as diamond rippled structure. What this means according to the invention is that the contact areas comprise a flat, essentially rectangular or diamond-shaped surface. They are formed, for example, by milling or sawing notches perpendicular to each other into the surface of the mating roll.

Another alternative form of rippled structure consists in a peaked or pyramidal rippled structure. What this means is that the contact areas of the mating roll are not flat and parallel to the surface of the mating roll but rather are designed in the form of peaks or pyramids with corresponding slanted surfaces. Depending on the distribution density of the pyramids, the peaks penetrate to different depths into the composite sheet structure, and thus the desired contact areas of different sizes required for a constant applied surface pressure are obtained.

According to a preferred embodiment, the lateral surface of the mating roll comprises different longitudinal sections extending parallel to an axis of rotation of the mating roll, wherein the contact areas of the elevations are the largest in a first longitudinal section of the lateral surface of the mating roll in which the lateral surface of the mating roll has been reduced to the greatest extent by the recesses.

In a corresponding manner, the contact areas should be the smallest in a second longitudinal section of the lateral surface of the mating roll in which the area of the mating roll is not interrupted by the recesses. In this configuration, therefore, the size of the contact areas of the elevations decreases from the maximally interrupted first longitudinal section of the lateral surface of the mating roll to the uninterrupted second longitudinal section of the lateral surface of the mating roll. When the blister pockets are distributed in the conventional, uniform manner over the surface of the mating roll and when the sealing roll exerts a constant pressure in each position, this type of rippled structure leads to an applied pressure which is also essentially constant, because the entire "net contact area" present in each longitudinal section of the lateral surface of the mating roll is constant over the entire circumference of the mating roll.

An especially uniform sealing effect is obtained when the applied pressure between the molded sheet and the cover sheet is constant in every position of the sealing roll. Shadow marks on the sheet are thus suppressed, and partial punctures of the cover sheet as well as unsealed areas are avoided.

BRIEF DESCRIPTION OF THE DRAWINGS

The invention is described in greater detail below with reference to the exemplary embodiments illustrated in the drawings.

FIG. 3 is a schematic top view of the contact area of a device according to the invention in a first position of the composite sheet structure on the mating roll.

FIG. 4 is a schematic top view of the contact area of a device in a second position of the composite sheet structure on the mating roll.

FIG. 5 is a schematic side view of the contact area of a device according to the invention in the first position of the mating roll shown in FIG. 3.

FIG. 6 is a schematic side view of the contact area of a device according to the invention in the second position of the mating roll shown in FIG. 4.

DETAILED DESCRIPTION OF THE INVENTION

Figure 1:
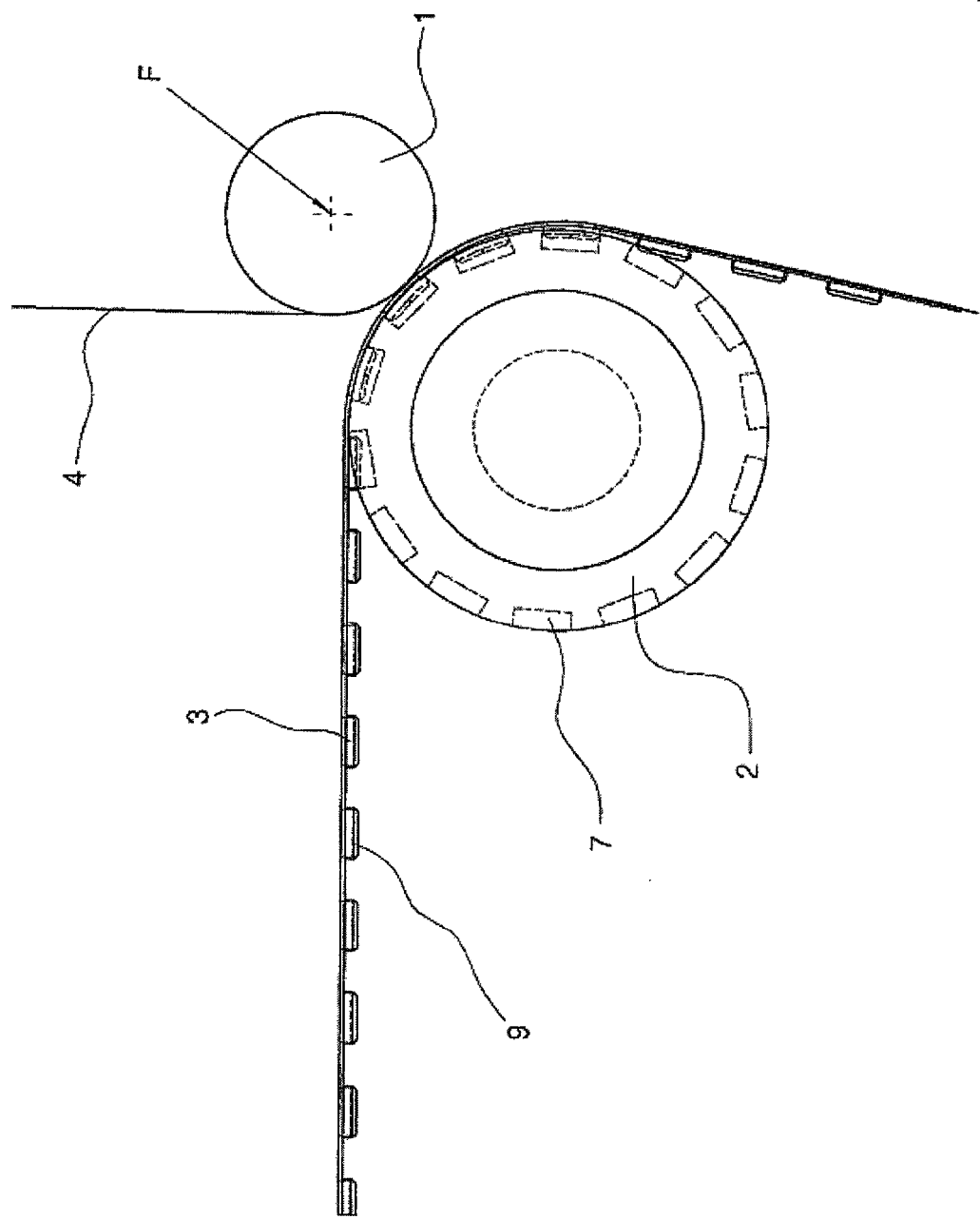
FIG. 1 is a schematic diagram of the essential components of a preferred embodiment of a device for roll-sealing according to the invention in a side view.

FIG. 1 is a schematic side view of a preferred embodiment of the device for the roll-sealing of sheets according to the invention. The device comprises a sealing roll 1 and a mating roll 2, also called a feed roll. A molded sheet 3, which comprises filled blister pockets 9 formed therein, and a cover sheet 4 are guided between the sealing roll 1 and the mating roll 2. The molded sheet 3 and the cover sheet 4 are transported to the mating roll 2 and the sealing roll 1 from different directions. Because it is heated by a heater (not shown), the sealing roll 1 comprises a higher temperature than the mating roll 2 and is pressed against the mating roll by the sealing force F. The cover sheet 4 is therefore pressed onto the molded sheet 3 at the contact point between the two rolls and bonded to it, a process which is referred to as "sealing". After leaving the roll-sealing device, the sealed composite molded sheet structure is sent on to the downstream devices of the packaging line The mating roll 2 comprises recesses 7 in its circumferential surface, into which the blister pockets 9 of the molded sheet 3 fit during the sealing process.

Figure 2:
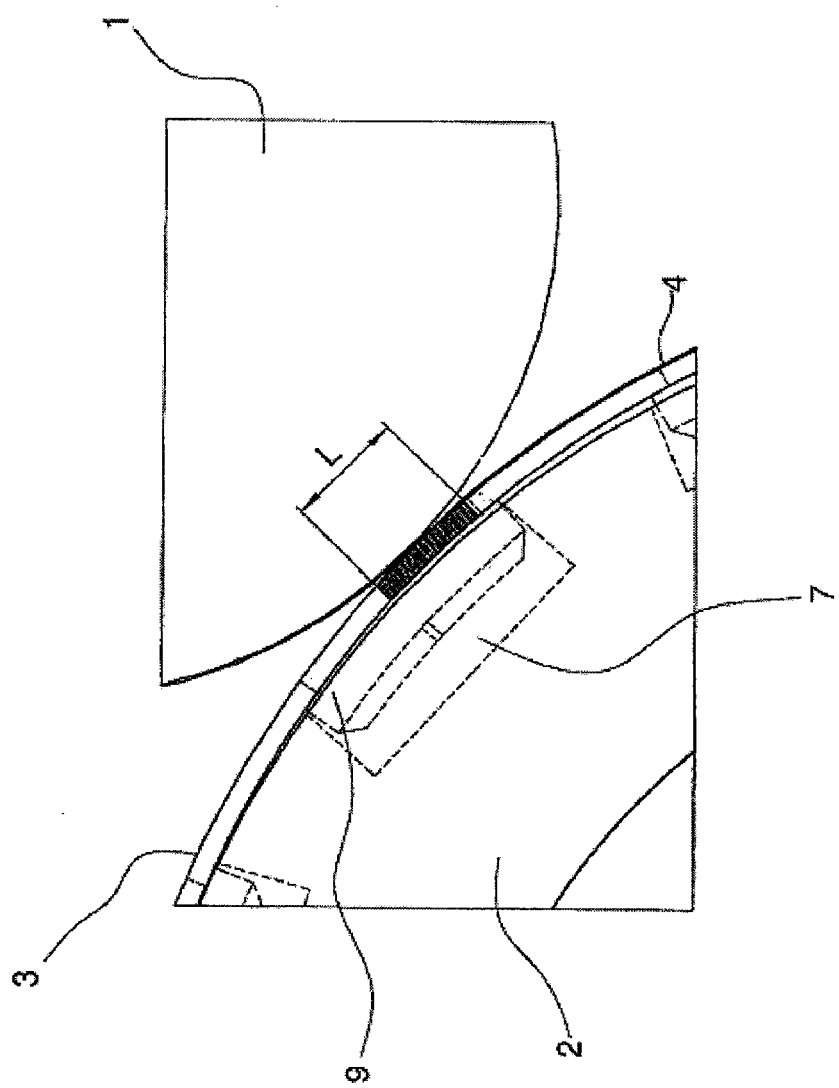
FIG. 2 is a side view of a sealing section of the embodiment according to FIG. 1.

FIG. 2 shows in detail the contact zone, that is, the area where the pressure of the heated sealing roll 1 presses the cover sheet 4 and the molded sheet 3 against the mating roll 2 and thus bonds the two sheets together. The section where the two sheets are bonded together is called the contact zone, which has the length L. We can also see in FIG. 2 how the blister pockets 9 formed in the molded sheet 3 fit exactly into the recesses 7 in the mating roll 2.

FIG. 3 is a top view of the contact zone of a device for the roll-sealing of sheets according to the invention in a first position of the mating roll 2, wherein the sealing roll 1 has been omitted for the sake of clarity. The molded sheet 3 with the blister pockets 9 formed therein moves in the transport direction as it lies on the mating roll.

The mating roll 2 has a plurality of longitudinal sections on the lateral surface of the mating roll 2, which sections extend in parallel to the axis of rotation of the mating roll 2. In the first position shown in FIG. 3, the contact zone coincides with a second longitudinal section of the lateral surface of the mating roll 2, where there are no recesses 9. In this area, the molded sheet 3 has no blister pockets over the entire width of the molded sheet; that is, the contact surface is uninterrupted. This means that the entire sealing force F of the sealing roll 1 acts on the contact zone, the area of which can be determined in a first approximation as L×B, wherein B is the width of the molded sheet 3. The applied pressure, which is responsible for the sealing of the cover sheet 4 to the molded sheet 3, therefore has the same value at each point in the contact zone and is perpendicular to the lateral surface of the mating roll 2.

FIG. 4 is a top view of the contact zone of the device for roll-sealing according to the invention in a second position of the molded sheet 3 on the mating roll 2. Here a row of blister pockets 9 in the molded sheet 3 lie almost completely within the length L of the contact zone. Because the contact zone is interrupted multiple times by the recesses 7, the surface area to which the sealing roll 1 can apply the sealing force F has been decreased considerably in such first longitudinal section of the mating roll 2. Thus, at a constant sealing force F, the surface pressure applied to the areas of the contact zone lying between the blister pockets 9 would normally be sharply increased.

FIG. 5 is a schematic side view of the contact zone illustrated in FIG. 3 in the first position, namely, in the situation where the contact zone lies between two rows of recesses 9 adjacent to each other in the transport direction. FIG. 6 is a schematic side view of the contact zone illustrated in FIG. 4 in the second position, wherein the contact zone is interrupted to the maximum extent across the width B of the molded sheet 3 by the recesses 9 in the molded sheet 3. In both FIGS. 5 and 6, the sealing roll 1 comprises its own rippled structure, wherein the flat surfaces of the rippled structure elevations press against the cover sheet and penetrate into it by penetration depth S1. The rippled structure of the mating roll 2 in FIG. 5 differs from that in FIG. 6, wherein these rippled structures are designed on the basis of parameters such as the width K of the elevations formed by the rippled structure and by the pitch T, i.e., the distance between adjacent elevations. It should also be noted in relation to FIGS. 5 and 6 that the illustration of the mating roll 2 with continuous rippled structure is purely schematic, for, according to the invention, the rippled structure changes in its dimensions across the entire surface of the mating roll and specifically is not uniform around the circumference of the mating roll 2.

In FIG. 5, the rippled structure of the mating roll 2 is designed as peaked or pyramidal rippled structure and extends over the width B of the molded sheet 3. So that the applied pressure caused by the sealing force F remains constant in the contact zone, the contact area of the elevations must be relatively small. The parameter K therefore approaches zero, because the elevations do not comprise a flat surface. At a constant sealing force F, the elevations penetrate by a distance S2 into the molded sheet 3.

FIG. 6 is a schematic side view of the situation in which the contact zone is located in the position of FIG. 4. The rippled structure here is linear. So that the constant sealing force F can be absorbed by the contact zone, the surface area of which has been reduced by the area of the recesses 9, without the applied surface pressure changing from that in the situations illustrated in FIGS. 3 and 5, the elevations of the rippled structure of the mating roll 2 must comprise a larger surface area. The rippled structure of the mating roll 2 comprises a defined width K at a pitch T, as a result of which the elevations acquire a much larger contact area. The penetration depth S2 of the mating roll 2 into the molded sheet 3 is smaller because of this larger area. The applied pressure, however, is constant over the entire contact zone and comprises the same value as the applied surface pressure present in the position shown in FIGS. 3 and 5.

As a result of the different types of rippled structure, which changes as a function of the position of the recesses 7 in the mating roll 2, the sum of the penetration depths S1+S2 of the ripple structures also changes. This adaptation to the geometric relationships of the surface of the mating roll 2 leads to a constant applied pressure of the cover sheet 4 onto the molded sheet 3 and thus to a uniform sealing effect.

Figure 7:
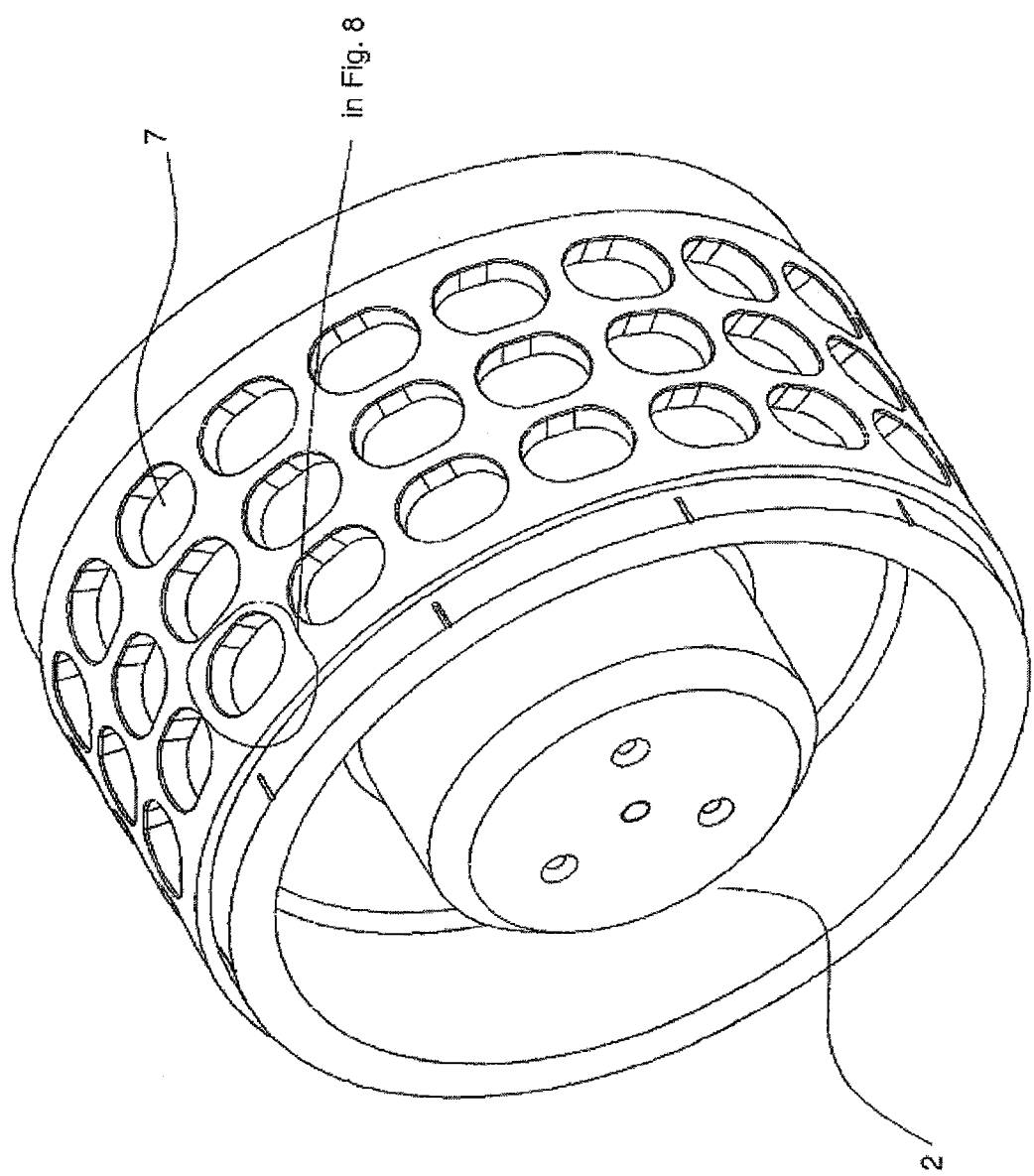
FIG. 7 is a perspective view of a mating roll as part of a preferred embodiment of the device according to the invention.

FIG. 7 is a schematic perspective view of a mating roll 2 with recesses 7 formed therein to accept the blister pockets 9 of the molded sheet 3 (not shown in FIG. 7).

Figure 8:
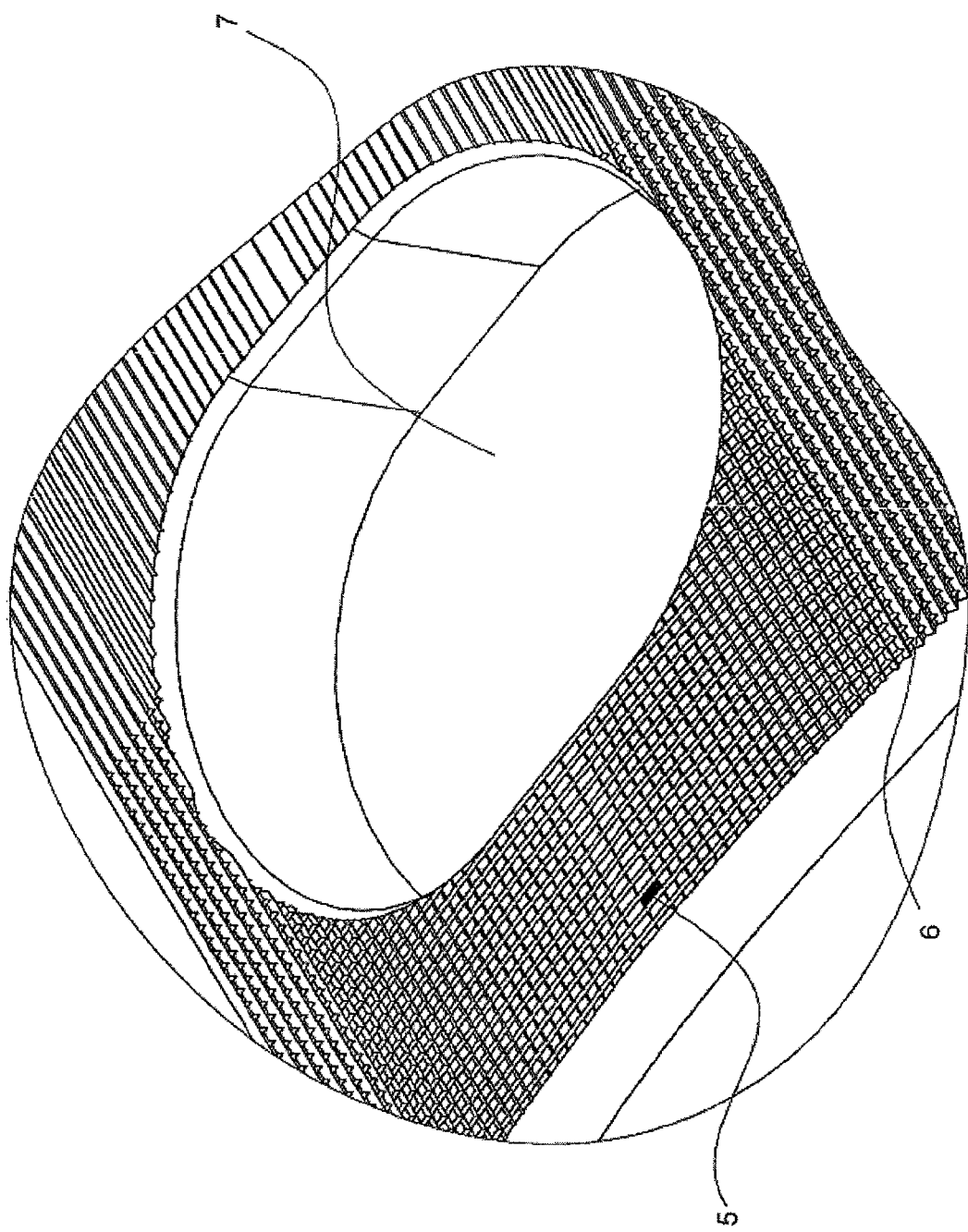
FIG. 8 shows a part of the surface of the mating roll of FIG. 7.

FIG. 8 is a perspective view of a detail of the surface of the mating roll 2 taken from FIG. 7. It is easy to see the elevations 5 and 6 of different sizes, produced as a result of the different ways in which the surface is rippled. The size of the contact areas of the elevations reaches a maximum in the first longitudinal section of the lateral surface where the width of the overall mating roll 2 is interrupted to the maximum extent by the recesses 7. The contact area 5 is an example of the type of contact areas present in this region. The contact area 6 stands as an example of the types of contact areas present in the second longitudinal sections of the lateral surface where the width of the mating roll 2 is not interrupted by the recesses 7. In this area, the size of the contact areas is minimal. In the area between the contact areas 5 and the contact areas 6 shown in FIG. 8, the size of the contact areas decreases with decreasing interruption of the width by the recesses 7. The surface structure of the mating roll 2 is therefore adapted as a function of the positions of the arranged recesses 7. Contact areas which exert a high degree of individual surface pressure, characterized by the contact surface 5, and contact areas which exert a low degree of surface pressure, shown by way of example by the contact surface 6, are therefore formed, wherein the sum of the total applied surface pressure across the width B of the mating roll 2 remains constant. It should be noted that the distribution of the recesses 7 in the mating roll 2 does not necessarily have to be in the form of regular rows and columns. Other, irregular distributions would also be possible.

Another advantage of the present invention is that the sealing force F can be reduced by selecting appropriate dimensions for the different-sized elevations formed by the rippled structure. This simplifies the design of the overall device and thus reduces costs.

By means of the invention, an improved device for the roll-sealing of sheets is provided, which comprises a simple design and makes possible a high-quality roll-sealing process.

The invention claimed is:

1. A device for the roll-sealing of sheets, comprising:
   a mating roll having a lateral surface; and
   a sealing roll, which presses against the mating roll with a sealing force, so that a molded sheet having blister pockets and a cover sheet can be guided between the sealing roll and the mating roll and sealed together to form a sealed composite sheet structure;
   wherein the lateral surface of the mating roll comprises,
      recesses to accept the blister pockets of the molded sheet,
      a rippled structure having elevations, which comprise contact areas of different sizes, and
      different longitudinal sections extending parallel to an axis of rotation of the mating roll, wherein the contact areas of the elevations are the largest in first longitudinal sections of the lateral surface of the mating roll in which the lateral surface of the mating roll has been reduced to the greatest extent by the recesses, and wherein the contact areas of the elevations are the smallest in second longitudinal sections of the lateral surface of the mating roll in which the lateral surface of the mating roll is not interrupted by the recesses.

2. The device according to claim 1, wherein the sealing force of the sealing roll is constant.

3. The device according to claim 1, wherein the rippled structure is designed as a linear rippled structure.

4. The device according to claim 1, wherein the rippled structure is designed as a peaked or pyramidal rippled structure.

5. The device according to claim 1, wherein a size of the contact areas of the elevations decreases continuously in each case from the first longitudinal sections of the lateral surface of the mating roll towards the second longitudinal sections of the lateral surface of the mating roll.

6. The device according to claim 1, wherein an applied pressure between the molded sheet and the cover sheet is constant.

* * * * *